UNITED STATES PATENT OFFICE.

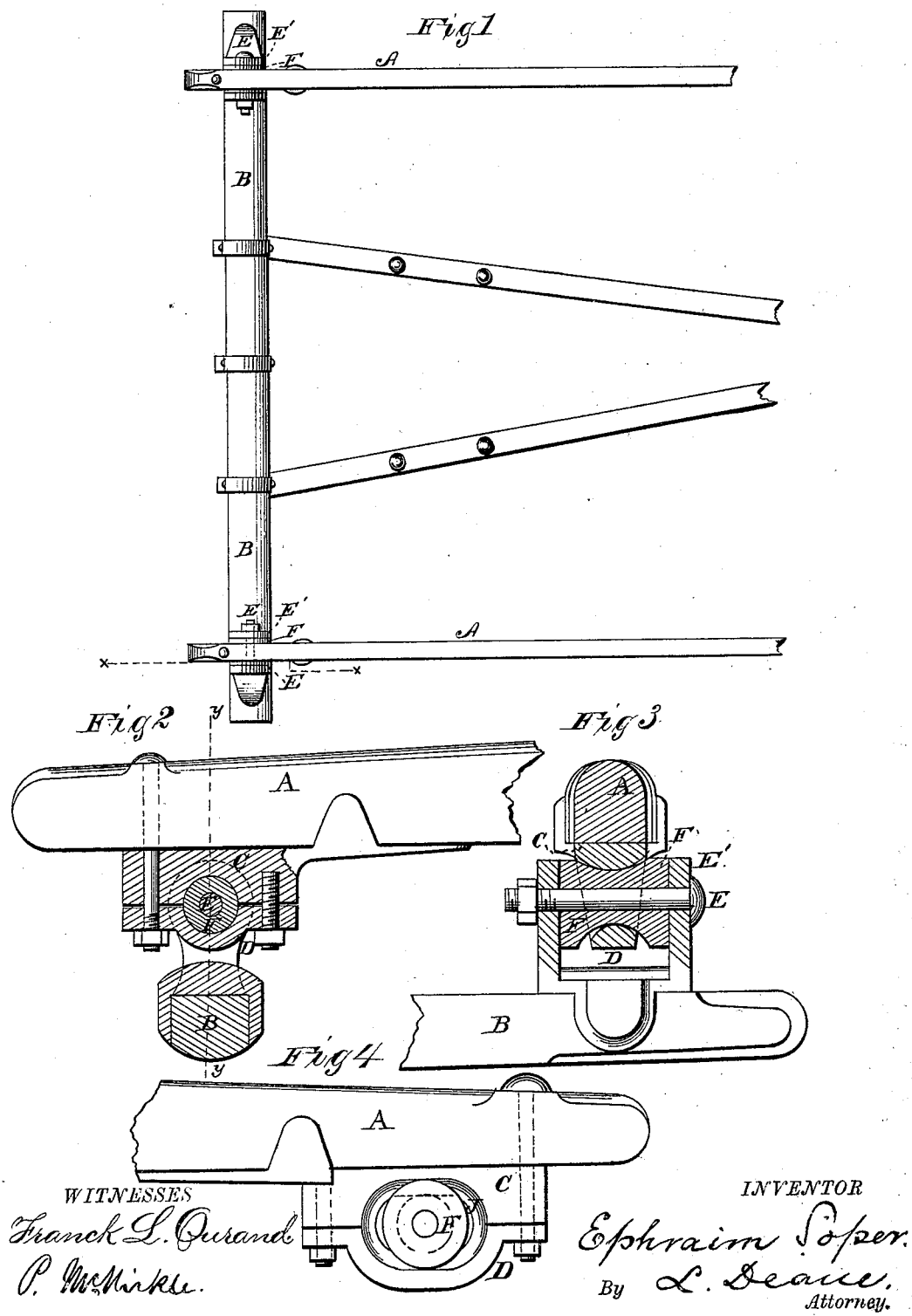

EPHRAIM SOPER, OF NEW YORK, N. Y.

IMPROVEMENT IN SIDE-BAR WAGONS.

Specification forming part of Letters Patent No. 177,292, dated May 9, 1876; application filed December 28, 1874.

*To all whom it may concern:*

Be it known that I, EPHRAIM SOPER, of the city, county, and State of New York, have invented new and useful Improvements in Side-Bar Wagons, of which the following is a specification:

The nature of this invention consists in providing a joint-connection between the side bar and bolster of a side-bar wagon, and interposing between the metal parts of said joint a flexible cushion, to prevent contact, and provide an elastic bearing for the parts, by which means the twisting of the several parts, or any of them, is guarded against, and likewise the parts are prevented from rattling, and also from wearing against each other, all as will now be more particularly described and explained.

Figure 1 is a plan view of a portion of the running-gear of a side-bar wagon contrived according to my invention. Fig. 2 is a section of Fig. 1 on the line *x x*. Fig. 3 is a section of Fig. 2 on the line *y y*; and Fig. 4 is a side elevation of one of the end couplings of the side bar, showing a contrivance for compensating for the lengthening and shortening of the bar in springing up and down.

Similar letters of reference indicate corresponding parts.

A represents the side bars; B, the bolster or spring, to which they are coupled at the ends for support; C D, the metal boxes on the bars, and E E' bolt and clip or jack on the bolsters or springs for the coupling. F is the cushion of rubber which I interpose between the boxes and the bolt and clip to render the joint flexible, and also to prevent the contact of the metal parts of the coupling for preventing noise and wear. This rubber cushion is in the form of a cylinder, with a hole in the center for the bolt E; also, a wide circumferential groove in the middle, to receive the convex boxes C D, and hold them so as to keep them from touching the ears of the jack E'. The groove in the cushion will be formed on a little greater radius than the convex curve of the boxes, so as to allow them to roll a little, as it requires to do when the spring or bolster changes position by springing, &c.; but the boxes are so much narrower than the length of the cushion and the space between the ears of the jack as to be effectually prevented from coming in contact with them when so rolling. At one end I propose to have elongated notches J in the boxes, to allow sufficient endwise play of the bar on the coupling to compensate for the lengthening and shortening of the bar by springing.

In case the boxes C D are made of a single piece of metal the cushion may be separated crosswise at the middle, to be put in the box from each side.

I have shown and described a grooved rubber cushion, in connection with a thill-coupling, in another application of even date herewith.

Having described my invention, what I claim is—

The metal boxes or clips C D and rubber cushion F, in combination with the bar A, bolt E, clips E', and bolster B, substantially as and for the purposes set forth.

EPHRAIM SOPER.

Witnesses:
T. B. MOSHER,
ALEX. F. ROBERTS.